United States Patent [19]

Kimura et al.

[11] Patent Number: 5,192,890
[45] Date of Patent: Mar. 9, 1993

[54] VIBRATION DRIVEN ACTUATOR

[75] Inventors: Atsushi Kimura, Yokohama; Hiroyuki Seki, Urawa; Yoshifumi Nishimoto, Yokohama, all of Japan

[73] Assignee: Canon Kabushiki Kaisha, Tokyo, Japan

[21] Appl. No.: 892,483

[22] Filed: Jun. 3, 1992

Related U.S. Application Data

[63] Continuation of Ser. No. 587,785, Sep. 25, 1990, abandoned.

[30] Foreign Application Priority Data

Sep. 25, 1989 [JP] Japan ............................ 1-111859[U]
Nov. 6, 1989 [JP] Japan ............................ 1-288148

[51] Int. Cl.$^5$ ............................................. H01L 41/08
[52] U.S. Cl. .................................................. 310/323
[58] Field of Search ................................. 310/323, 328

[56] References Cited

U.S. PATENT DOCUMENTS

| | | | |
|---|---|---|---|
| 4,645,964 | 2/1987 | Hiramatsu et al. | 310/323 |
| 4,672,256 | 6/1987 | Okuno et al. | 310/323 |
| 4,692,650 | 9/1987 | Okumura et al. | 310/323 |
| 4,692,651 | 9/1987 | Hiramutsu et al. | 310/323 |
| 4,692,652 | 9/1987 | Seki et al. | 310/323 |
| 4,752,711 | 6/1988 | Tsukimoto et al. | 310/323 |
| 5,017,823 | 5/1991 | Okumura | 310/323 |
| 5,025,186 | 6/1991 | Tsukada | 310/323 |
| 5,041,750 | 8/1991 | Kitani | 310/323 |
| 5,079,470 | 1/1992 | Kasuga et al. | 310/323 |

FOREIGN PATENT DOCUMENTS

| | | | |
|---|---|---|---|
| 0139279 | 6/1986 | Japan | 310/323 |
| 0139281 | 6/1986 | Japan | 310/323 |
| 0139282 | 6/1986 | Japan | 310/323 |
| 0034184 | 2/1989 | Japan | 310/323 |
| 0222672 | 9/1989 | Japan | 310/323 |

Primary Examiner—Mark O. Budd
Attorney, Agent, or Firm—Fitzpatrick, Cella, Harper & Scinto

[57] ABSTRACT

A vibration driven motor has a rail-like stator secured to a bottom plate and a vibration member for generating a travelling vibration wave in an elastic member to which an electro-mechanical energy conversion element is fixed due to an application of AC electric field to the electro-mechanical energy conversion element so as to bring a portion of the elastic member into press-contact with the rail-like stator. In the vibration driven motor a surface area of the bottom portion of the rail-like stator which comes in contact with the bottom plate is less than the a surface area of the top portion of the rail-like stator.

20 Claims, 4 Drawing Sheets

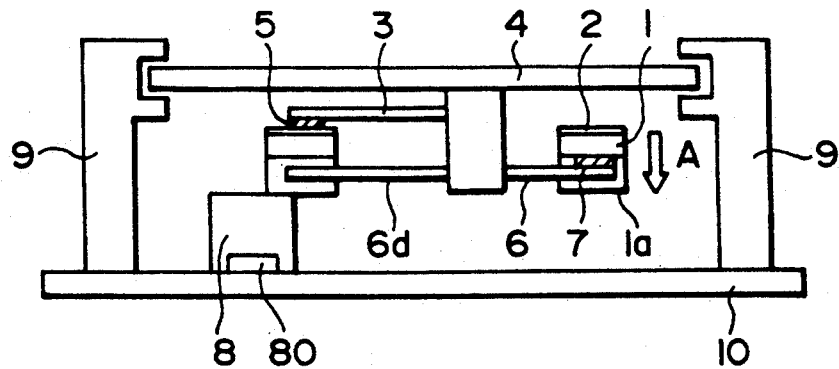
F I G. 1
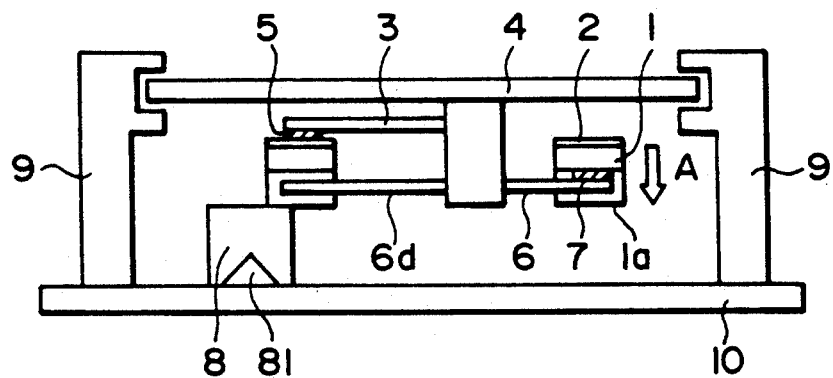
F I G. 2
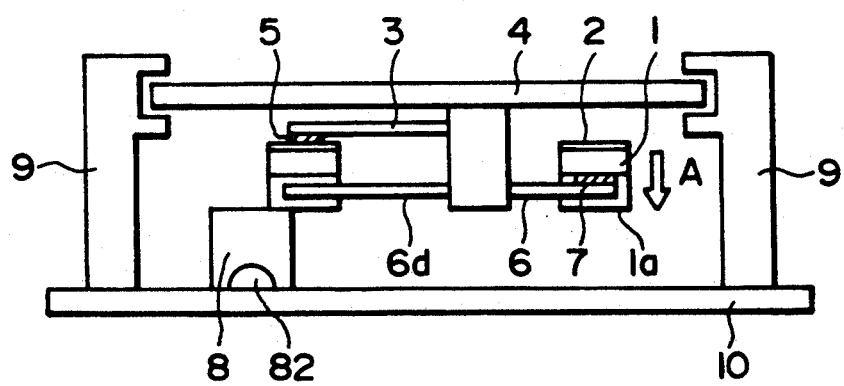
F I G. 3

VIBRATION DRIVEN ACTUATOR

This application is a continuation of application Ser. No. 587,785, filed Sep. 25, 1990, now abandoned.

BACKGROUND OF THE INVENTION

1. Field of the Invention

The present invention relates to a vibration driven motor, and, more particularly, to a vibration driven motor of a type arranged in such a manner that an elastic member for generating a travelling vibration wave is moved along a rail-like stator.

2. Related Background Art

Hitherto, there has been disclosed a structure of a vibration driven motor of the type described above, for example, constituted as shown in FIGS. 6 and 7.

Referring to the drawings, reference numeral 1 represents an elastic member in the form of an ellipse and having a projection 1a formed on the moving side thereof, a piezo-electric element 2 bonded to the elastic member 1 on the top surface thereof for the purpose of generating a travelling vibration wave. Reference numeral 8 represents a rail-like stator for frictionally coming in contact with the elastic member 1, the rail-like stator 8 being brought into press-contact with an elastic spring 3 via a vibration insulating material 5 (for example felt).

Reference numeral 6 represents a comb shaped stopper having a comb portion 6a inserted into a slit formed in the portion of the elastic member 1 which is not positioned in contact with the rail-like stator 8. The comb portion 6a supports the elastic member 1 via a felt 7 placed in the bottom portion of the slit.

The elastic member 1 is supported on a frame 4 via the stopper 6 and the elastic spring 3. The frame 4, to which a printing head (omitted from illustration) is fixed is supported by a restricting member 9 for restricting the displacement except for that in direction By which is the predetermined direction of movement.

When the travelling vibration wave is formed in the elastic member 1 by a known method, the elastic member 1 moves on the rail-like stator 8 due to the frictional force generated by the rail-like stator 8 and the elastic member 1. In accordance with this, the frame 4 and the other elements 3, 5, 6 and 7 move in the direction BY along the restricting member 9. The frictional driving force generated at this time acts on a portion of the elastic member 1. Since the frictional driving force does not act on the supporting portion of the elastic member 1, a moment is generated in the elastic member 1, causing the elastic member 1 to be shifted in directions Bx and By.

The comb portion 6a of the stopper 6 is, as shown in FIG. 7, inserted into the slit portion (omitted from illustration) formed in the elastic member 1. As a result, the displacement of the elastic member 1 in the direction By is restricted and the dead weight of the elastic member 1 is supported by the comb portion 6a via the felt 7. Restricting portions 6b and 6c restrict the displacement of the elastic member 1 in the direction Bx, while a restricting member 6d restricts the displacement of the elastic member 1 in the direction By on the side to which the pressure is applied. As a result of the actions of the restricting members 6a to 6d, shake of the elastic member 1 can be prevented so that it can be moved smoothly and linearly together with the frame 4.

However, according to the above-described conventional structure, since the bottom surface of the rail-like stator 8 is positioned in full contact with the bottom plate 10, the stator 8 cannot with completely contact with the bottom plate 10 if the accuracy of the flatness of the bottom surface is insufficient, causing a partial gap to be generated. As a result, the rail-like stator 8 and the bottom plate 10 undesirably beat each other due to the movement of the elastic member 1, causing noise to be generated.

An object of the present invention is to provide a vibration driving motor which is capable of overcoming the above-described conventional problem and in which the rail-like stator can be reliably secured to the bottom plate by a simple structure.

Other and further objects, features and advantages of the invention will be appear more fully from the following description.

SUMMARY OF THE INVENTION

In order to achieve the above-described object of the present invention, an aspect of the present invention lies in a vibration driven motor having a rail-like stator secured to a bottom plate and a vibration member for generating a travelling vibration wave in an elastic member to which an electro-mechanical energy conversion element is fixed due to an application of AC electric field to the electro-mechanical energy conversion element so as to bring a portion of the elastic member into press-contact with the rail-like stator, the vibration driven motor being characterized in that the width of the portion of the rail-like stator which comes in contact with the bottom plate is arranged to be smaller than the width of the rail-like stator.

BRIEF DESCRIPTION OF THE DRAWINGS

FIGS. 1 to 5 are side views which respectively illustrate the structures of first to fifth embodiments of a vibration driven motor according to the present invention;

DESCRIPTION OF THE PREFERRED EMBODIMENTS

Figure 4:
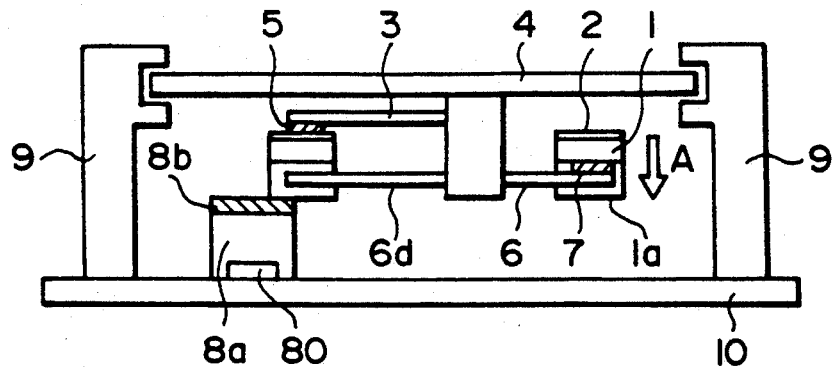

Preferred embodiments of the present invention will be described with reference to the drawings, where the same elements as those according to the conventional structure are given the same reference numerals and their description is omitted here.

FIG. 1 is a schematic view which illustrates an essential portion of a bubble jet printer to which the present invention is applied.

The bubble jet printer is a printer of a type disclosed in U.S. Pat. No. 4,723,129 and that in U.S. Pat. No. 4,740,796.

Then, the structure of the bubble jet printer will be described briefly. When an electro-mechanical energy conversion member, disposed so as to correspond to a sheet or a liquid passage which encloses liquid (ink), is applied with at least one operation signal corresponding to the recording information and capable of rapidly raising the temperature of the electro-mechanical energy conversion member exceeding the nuclear boiling, thermal energy is generated in the electro-mechanical energy conversion member. The surface of the recording head experiences film boiling, causing an air bubble corresponding to the above-described operation signal to be formed in the liquid (ink). The enlargement and the contraction of the air bubble cause the liquid (ink) to be discharged through the discharge port so that at least one droplet is formed. The thus formed droplet is sprayed against the sheet so that characters are formed.

According to an embodiment shown in FIG. 1, a rectangular-shape groove 80 is formed at the lower end of the rail-like stator 8 so that the area of the rail-like stator 8 which is positioned in contact with the bottom plate 10 of the printer is reduced.

FIG. 2 illustrates a second embodiment of the present invention in which the area of the rail-like stator 8 which is positioned in contact with the bottom plate 10 is reduced by forming an inverted V-shape groove 81 in the surface of the rail-like stator 8 which is secured to the bottom plate 10. Furthermore, according to a third embodiment shown in FIG. 3, a U shape groove 82 is formed in the surface of the rail-like stator 8 which comes in contact with the bottom plate 10.

The rail-like stator 8 according to the respective embodiments shown in FIGS. 1 to 3 is integrally formed by a resin or by an elastic member. However, as shown in FIG. 4, the rail-like stator 8 may be made of an elastic member to which a resin 8b is fixed to the top surface of the rail-like true stator 8a thereof in such a manner that the area of contact is reduced similarly to the above-described embodiments. As a result, a structure capable of overcoming the above-described problem can be realized.

Figure 5:
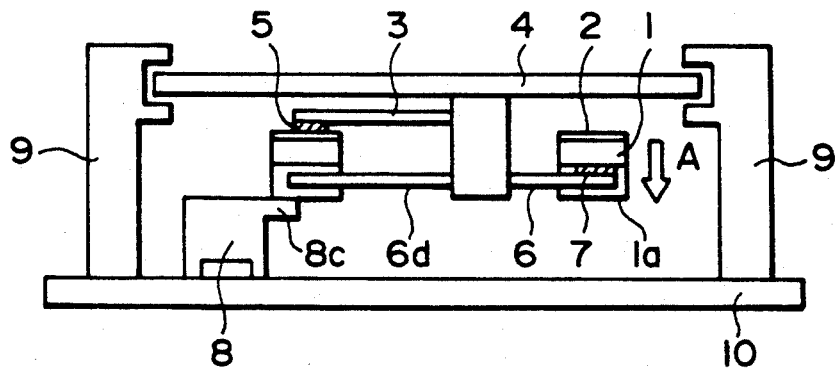
Figure 6:
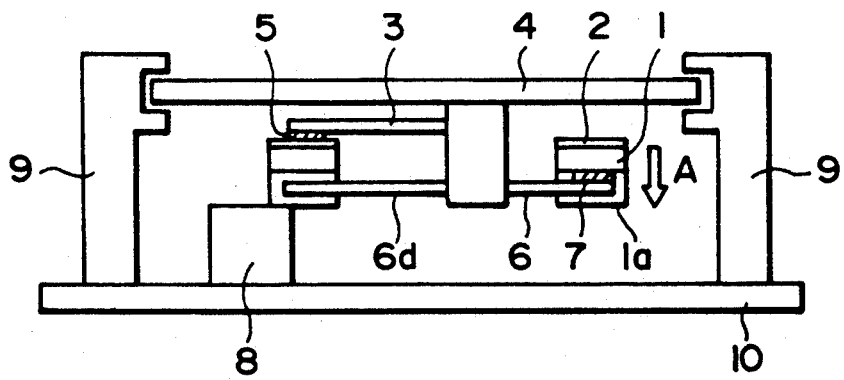
FIGS. 6 and 7 are a side view and a plan view respectively which illustrate the structure of a conventional vibration driven motor.
Figure 7:
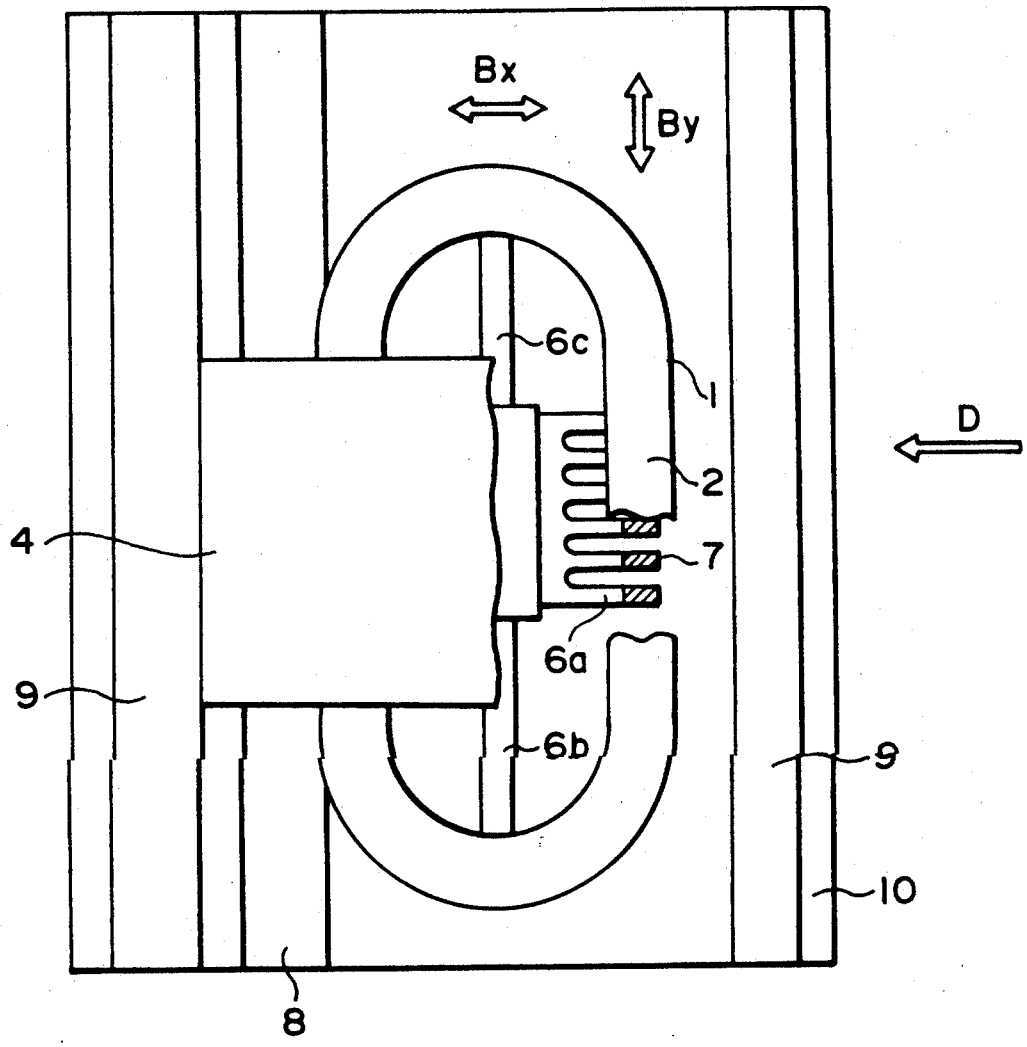

Another structure shown in FIG. 5 may be employed which has a flange 8c and which is arranged in such a manner that the area of contact with the bottom plate 10 is reduced. In general, the rail-like stator 8 made of a material such as an elastic material having a large Young's modulus generates noise when subjected to vibrations generated in the elastic member 1. However, the vibration of the elastic member 1 is absorbed by virtue of the elasticity created by a structure arranged in such a manner that the flange 8c as shown in FIG. 5 is provided so as to bring the elastic member 1 into contact with the flange 8c.

Figure 8:
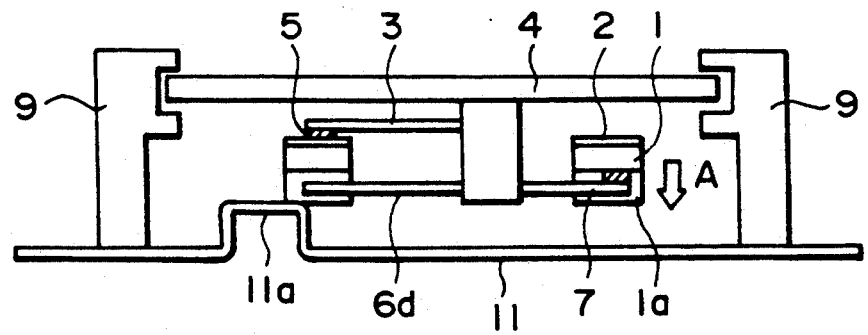
FIG. 8 is a side view which illustrates an example of a printer to which the present invention is applied.

FIG. 8 illustrates another embodiment of the present invention, which is applied to the above-described bubble jet printer. According to this embodiment, a rectangular-shape rail-like projection portion 11a is formed by bending the bottom plate 11 of the printer so as to make is serve as the rail-like stator. Thus, the elastic member 1 is able to move on the rail-like projection portion 11a. As a result, the number of the necessary parts can be reduced in addition to the effects obtainable from the above-described embodiments.

In the case when the thickness of the rail-like stator as shown in FIG. 1 is reduced for the purpose of reducing its weight, the rigidity of the rail-like stator deteriorates and the flatness of the rail-like stator also deteriorates. As a result, undesirable noise may be generated when the elastic member 1 moves on the stator due to the presence of a gap between the elastic member and the stator. The above-described problem can be overcome according to this embodiment since the rigidity of the stator having the projection portion 11a is not deteriorated.

Figure 9:
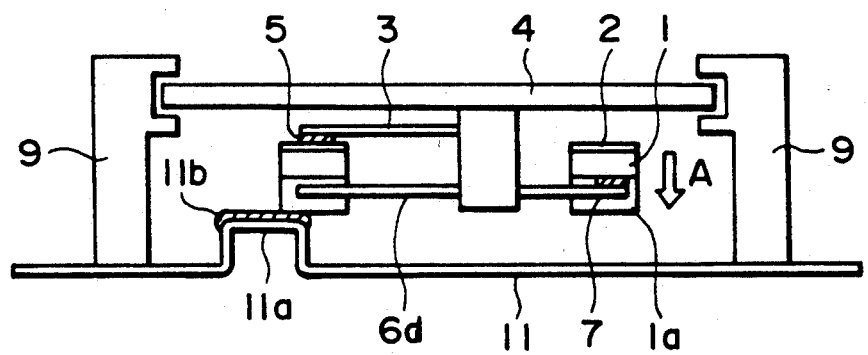
FIGS. 9 and 10 are side views which respectively illustrate other embodiments.

FIG. 9 illustrates another embodiment of the present invention in which the wear resistance is improved by fixing a resin 11b to the top surface of the rail-like projection portion 11a shown in FIG. 8.

Figure 10:
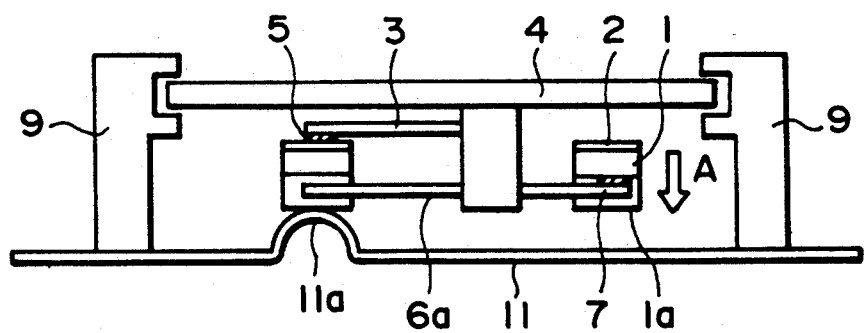

FIG. 10 illustrates a still further embodiment of the present invention in which the rail-like projection portion 11a is arranged to be in the form of a semicircular shape.

According to this embodiment, the elastic member 1 is able to smoothly move since the rough surface of the edge portion of the elastic member 1 does not come in contact with the rail-like projection portion 11a even if the elastic member 1 is tilted considerably.

As described above, according to the present invention, the width of the contact portion between the rail-like stator and the bottom plate can be made smaller than the width of the rail-like stator by forming any of the rectangular-shape, inverted V-shape and inverted rectangular-shape grooves at the lower end portion of the elastic member, that is the stator which supports the vibration member. Therefore, the rail-like stator and the bottom plate can be brought into hermetical contact with each other, causing noise to be prevented.

According to the above-described embodiments, the travelling vibration wave generated in the vibration member including the elastic member 1 and the piezoelectric element 2 serving as the electro-mechanical energy conversion element is utilized as the power. However, a structure disclosed in U.S. Pat. No. 4,562,374 may be employed in which vibrations generated in vibration members 13, 18 and 19 shown in FIG. 2 thereof are utilized.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A vibration wave driven apparatus, comprising:
a supporting member having a first contact surface with a predetermined surface area and a second contact surface with a predetermined surface area, said surface area of said second contact surface being less than said surface area of said first contact surface;
a vibration member having a frictional surface in contact with said first contact surface of said supporting member and an electro-mechanical energy conversion member for generating a travelling vibration wave in response to an applied electrical signal, the vibration wave causing relative movement between said vibration member and said supporting member; and
a bottom plate having a surface which comes in contact with said second contact surface of said supporting member, wherein
said supporting member is fixed to a predetermined position on said bottom plate.

2. A vibration wave driven apparatus according to claim 1, wherein said vibration member is moved on said supporting member by the vibration wave.

3. A vibration wave driven apparatus according to claim 2, further comprising a guide member for guiding movement of said vibration member.

4. A vibration wave driven apparatus according to claim 3, wherein said guide member is disposed on said bottom plate at a predetermined position.

5. A vibration wave driven apparatus, comprising:
a supporting member having a first contact surface with a predetermined surface area and a second contact surface with a predetermined surface area, said surface area of said second contact surface being less than said surface area of said first contact surface;
a vibration member having a frictional surface in contact with said first contact surface of said supporting member and an electro-mechanical energy conversion member for generating a travelling vibration wave in response to an applied electrical signal, the vibration wave causing relative movement between said vibration member and said supporting member; and
a bottom plate having a surface which comes in contact with said second contact surface of said supporting member, wherein
said supporting member is fixed to a predetermined position on said bottom plate and has a V-shaped opening adjacent to said bottom plate.

6. A vibration wave driven apparatus, comprising:
a supporting member having a first contact surface with a predetermined surface area and a second contact surface with a predetermined surface area, said surface area of said second contact surface being less than said surface area of said first contact surface;
a vibration member having a frictional surface in contact with said first contact surface of said supporting member and an electro-mechanical energy conversion member for generating a travelling vibration wave in response to an applied electrical signal, the vibration wave causing relative movement between said vibration member and said supporting member; and
a bottom plate having a surface which comes in contact with said second contact surface of said supporting member, wherein
said supporting member is fixed to a predetermined position on said bottom plate and has a U-shaped opening adjacent to said bottom plate.

7. A vibration wave driven apparatus according to claim 1, wherein said first contact surface of said supporting member has a resin layer.

8. A vibration wave driven apparatus, comprising:
a supporting member having a first contact surface with a predetermined surface area and a second contact surface with a predetermined surface area, said surface area of said second contact surface being less than said surface area of said first contact surface;
a vibration member having a frictional surface in contact with said first contact surface of said supporting member and an electro-mechanical energy conversion member for generating a travelling vibration wave in response to an applied electrical signal, the vibration wave causing relative movement between said vibration member and said supporting member; and
a bottom plate having a surface which comes in contact with said second contact surface of said supporting member, wherein said supporting member is fixed to a predetermined position on said bottom plate, and wherein said supporting member has a flange portion to which said frictional surface of said vibration member comes in contact.

9. A vibration wave driven apparatus, comprising:
a bottom plate having a bent portion formed in a U-shape, said bent portion having a first surface and serving as a supporting member; and
a vibration member having a frictional surface in contact with said first surface of said supporting member and an electro-mechanical energy conversion member for generating a travelling vibration wave in response to an applied electrical signal, the vibration wave causing relative movement between said vibration member and said supporting member.

10. A vibration wave driven printer, comprising:
a supporting member having a first contact surface with a predetermined surface area and a second contact surface with a predetermined surface area, said surface area of said second contact surface being less than said surface area of said first contact surface;
a vibration member having a frictional surface in contact with said first contact surface of said supporting member and an electro-mechanical energy conversion member for generating a travelling vibration wave in response to an applied electrical signal, the vibration wave causing relative movement between said vibration member and said supporting member; and
a bottom plate having a surface which comes in contact with said second contact surface of said supporting member, wherein
said supporting member is fixed to a predetermined position on said bottom plate.

11. A vibration wave driven motor, comprising:
a supporting member having a first contact surface with a predetermined surface area and a second contact surface with a predetermined surface area, said surface area of said second contact surface being less than said surface area of said first contact surface;
a vibration member having a frictional surface in contact with said first contact surface of said supporting member and an electro-mechanical energy conversion member for generating a travelling vibration wave in response to an applied electrical signal, the vibration wave causing relative movement between said vibration member and said supporting member; and
a bottom plate having a surface which comes in contact with said second contact surface of said supporting member, wherein
said supporting member is fixed to a predetermined position on said bottom plate.

12. A vibration driven actuator, comprising:
a contact member having a first contact surface having a surface area and a second contact surface having a surface area, with said surface area of said second contact surface being less than said surface area of said first contact surface;
a vibration member having a frictional surface in contact with said first contact surface of said contact member and an electro-mechanical energy conversion member for generating a vibration wave in response to an applied electrical signal, the vibration wave causing relative movement between said vibration member and said contact member; and supporting means having a surface in contact with said second contact surface of said contact member, wherein said contact member is fixed to a predetermined position on said supporting means.

13. A vibration wave driven apparatus, comprising:

a bottom plate having a convexly bent portion, an upper surface of said bent portion forming a first surface of said bottom plate; and a vibration member for generating a travelling vibration wave in response to an applied electrical signal, said vibration member having a frictional surface provided in contact with said first surface and having an electro-mechanical energy conversion member, said travelling vibration wave causing a relative movement between said vibration member and said bottom plate.

14. A vibration wave driven apparatus according to claim 13, wherein said vibration member is driven on said bent portion of said bottom plate by the travelling vibration wave.

15. A vibration wave driven apparatus according to claim 14, further comprising a guide member for guiding movement of said vibration member.

16. A vibration wave driven apparatus according to claim 15, wherein said guide member is disposed on said bottom plate at a predetermined position.

17. A vibration wave driven apparatus according to claim 13, wherein a resin layer is provided on said first surface.

18. A vibration wave driven apparatus, comprising:

a bottom plate having a convexly bent portion, with said bent portion having a cross-section which is rectangular in shape, an upper surface of said bent portion forming a first surface of said bottom plate; and a vibration member for generating a travelling vibration wave in response to an applied electrical signal, said vibration member having a frictional surface provided in contact with said first surface and having an electro-mechanical energy conversion member, said travelling vibration wave causing a relative movement between said vibration member and said bottom plate.

19. A vibration wave driven apparatus, comprising:

a bottom plate having a convexly bent portion, with said bent portion having a cross-section which is semicircular in shape, an upper surface of said bent portion forming a first surface of said bottom plate; and a vibration member for generating a travelling vibration wave in response to an applied electrical signal, said vibration member having a frictional surface provided in contact with said first surface and having an electro-mechanical energy conversion member, said travelling vibration wave causing a relative movement between said vibration member and said bottom plate.

20. A vibration wave driven apparatus, comprising:

a supporting member having a flat contact surface having a surface area and a liner contact surface provided opposite from said flat contact surface and having a surface area, with said surface area of said linear contact surface being less than said surface area of said flat contact surface;

a vibration member having a frictional surface which is provided in contact with said flat contact surface of said supporting member and an electro-mechanical energy conversion member for generating a travelling vibration wave in response to an applied electrical signal thereto, the vibration wave causing relative movement between said vibration member and said supporting member; and a bottom plate having a surface in contact with said linear contact surface of said supporting member, wherein said supporting member is fixed to a predetermined position on said bottom plate.

* * * * *

UNITED STATES PATENT AND TRADEMARK OFFICE
CERTIFICATE OF CORRECTION

PATENT NO. : 5,192,890
DATED : March 9, 1993
INVENTOR(S) : ATSUSHI KIMURA, ET AL.

It is certified that error appears in the above-indentified patent and that said Letters Patent is hereby corrected as shown below:

On title page, Item
 [57] ABSTRACT

Line 11, "the a" should read --a--.

COLUMN 1

Line 37, "fixed" should read --fixed,--.
   Line 46, "BY" should read --By--.

COLUMN 2

Line 4, "with" should be deleted.
   Line 5, "with" should be deleted.

COLUMN 4

Line 19, "rectangular-shape" should read --U-shape--.

Signed and Sealed this

First Day of March, 1994

*Attest:*

BRUCE LEHMAN

*Attesting Officer*  Commissioner of Patents and Trademarks